(12) United States Patent
El-Saden et al.

(10) Patent No.: US 7,306,113 B2
(45) Date of Patent: Dec. 11, 2007

(54) DRINKING CONTAINER WITH EXTERIOR SHELL

(75) Inventors: Sami El-Saden, Chicago, IL (US); Mark Edward Fastabend, Chicago, IL (US)

(73) Assignee: Ignite USA, LLC, Chicago, IL (US)

( * ) Notice: Subject to any disclaimer, the term of this patent is extended or adjusted under 35 U.S.C. 154(b) by 0 days.

(21) Appl. No.: 11/190,660

(22) Filed: Jul. 27, 2005

(65) Prior Publication Data

US 2006/0163262 A1 Jul. 27, 2006

(51) Int. Cl.
- *A47J 41/00* (2006.01)
- *B65D 1/40* (2006.01)
- *B65D 6/10* (2006.01)
- B65D 81/38 (2006.01)
- B65D 8/06 (2006.01)

(52) U.S. Cl. .............. 220/592.17; 220/62.12; 220/62.15; 220/592.25; 220/592.27

(58) Field of Classification Search ........... 220/592.25, 220/592.26, 23.91, 739, 626, 592.17, 62.12, 220/62.15, 592.16, 62.18, 592.27, 592.2; 215/12.1, 13.1

See application file for complete search history.

(56) References Cited

U.S. PATENT DOCUMENTS

| | | | |
|---|---|---|---|
| 801,564 A | | 10/1905 | Allen et al. |
| 882,378 A | | 3/1908 | Friedlich |
| 2,725,733 A | * | 12/1955 | Davis .......................... 215/12.1 |
| 2,895,636 A | | 7/1959 | Martin |
| 3,120,570 A | * | 2/1964 | Kennedy et al. ............ 264/46.5 |
| 3,221,915 A | * | 12/1965 | Gort et al. .................. 215/13.1 |
| 4,184,601 A | * | 1/1980 | Stewart et al. ............. 215/13.1 |
| 4,273,245 A | * | 6/1981 | Hartinger Machalek ... 215/12.1 |
| 4,448,825 A | * | 5/1984 | Asahara ....................... 428/34.7 |
| 4,595,437 A | * | 6/1986 | Yamamoto ................... 156/87 |
| 4,928,848 A | | 5/1990 | Ballway |
| 5,056,749 A | | 10/1991 | Ige |
| 5,515,995 A | * | 5/1996 | Allen et al. ............ 220/592.16 |
| 5,531,353 A | | 7/1996 | Ward et al. |
| 5,678,725 A | * | 10/1997 | Yamada et al. ......... 220/592.21 |
| 5,918,761 A | * | 7/1999 | Wissinger .................... 220/713 |
| 6,164,191 A | | 12/2000 | Liu et al. |
| 6,179,155 B1 | * | 1/2001 | Komiya et al. ......... 220/592.11 |
| 6,237,801 B1 | | 5/2001 | Liu |
| 6,308,846 B1 | * | 10/2001 | Muller ....................... 215/13.1 |
| 6,405,892 B1 | | 6/2002 | Volan |
| 6,419,108 B1 | * | 7/2002 | Toida et al. ........... 220/592.17 |

(Continued)

Primary Examiner—Anthony D. Stashick
Assistant Examiner—Niki M. Eloshway
(74) Attorney, Agent, or Firm—McDermott Will & Emery, LLP

(57) ABSTRACT

A portable drinking container is provided. The drinking container comprises a drinking vessel, a separate skirt around the drinking vessel and a foam material located in a second cavity between the skirt and the drinking vessel. The drinking vessel has a sidewall defining a drinking cavity with an opening at a proximal end of the drinking vessel. The skirt is provided around a distal end portion of the drinking vessel. Generally, the drinking vessel is made of a first material and the skirt is made of a second material distinct from the first material, and in one embodiment the drinking vessel is made of a ceramic material and the skirt is made of stainless steel. Additionally, a removable fastener may be provided to connect the skirt to the drinking vessel.

3 Claims, 4 Drawing Sheets

U.S. PATENT DOCUMENTS

| | | |
|---|---|---|
| 6,520,369 B1 * | 2/2003 | Cytacki ................ 220/632 |
| 6,604,648 B2 | 8/2003 | Immerman et al. |
| D488,348 S | 4/2004 | Liu |
| 6,746,132 B2 | 6/2004 | Liu |
| 6,758,363 B2 | 7/2004 | Stokes |
| D505,592 S | 5/2005 | Liu |
| D505,831 S | 6/2005 | Liu |
| D506,641 S | 6/2005 | Liu |
| D510,681 S | 10/2005 | Liu |
| 2003/0029876 A1 | 2/2003 | Giraud |
| 2004/0017678 A1 | 1/2004 | Liu |
| 2004/0251259 A1 | 12/2004 | Copeland |
| 2005/0098565 A1 | 5/2005 | Liu |
| 2005/0103794 A1 | 5/2005 | Liu |

* cited by examiner

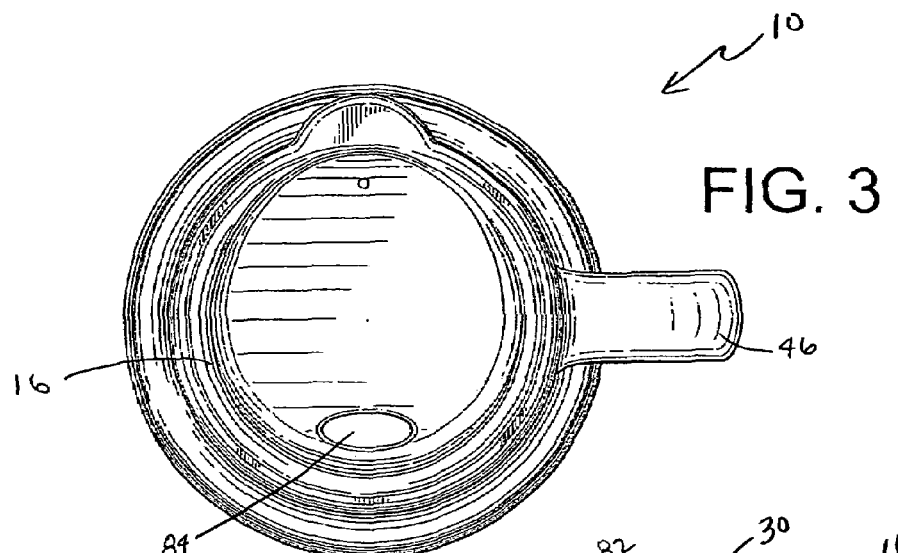
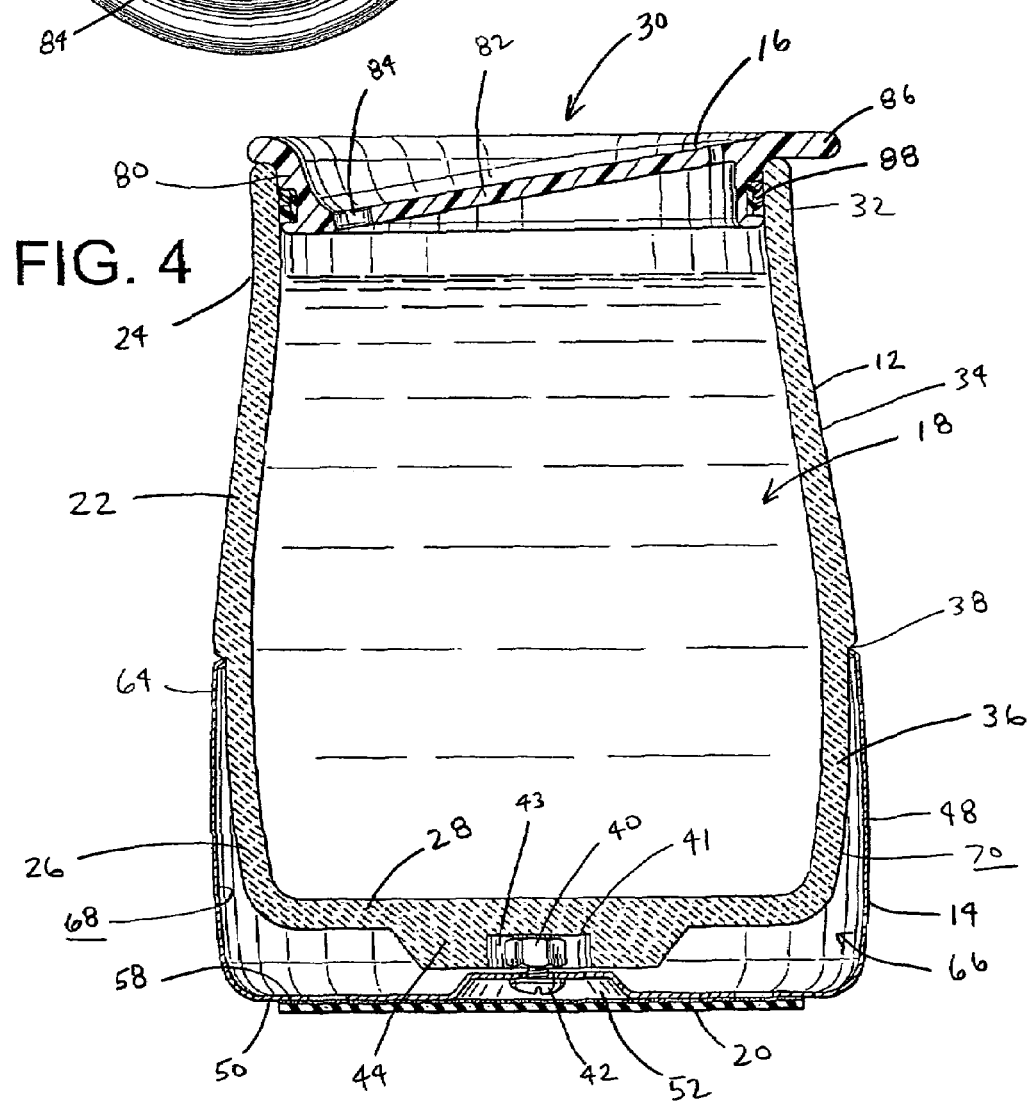

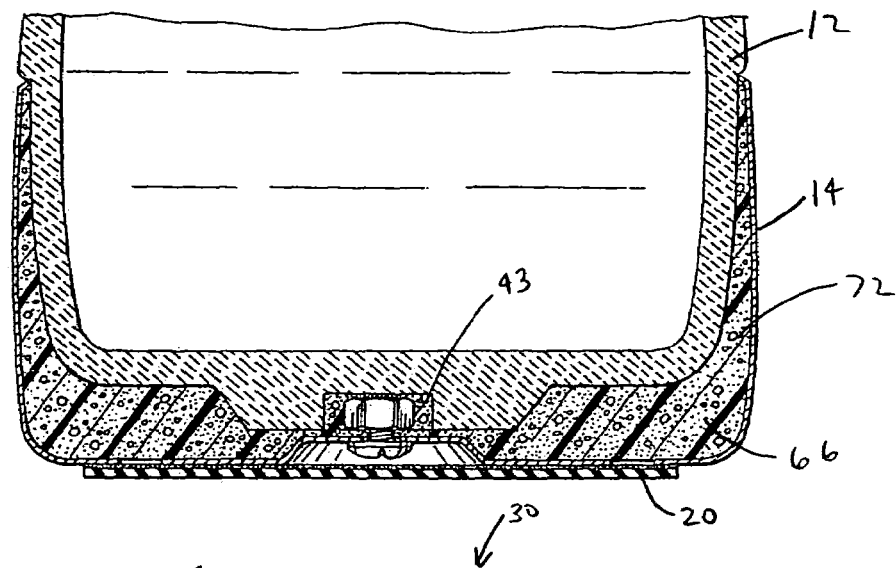
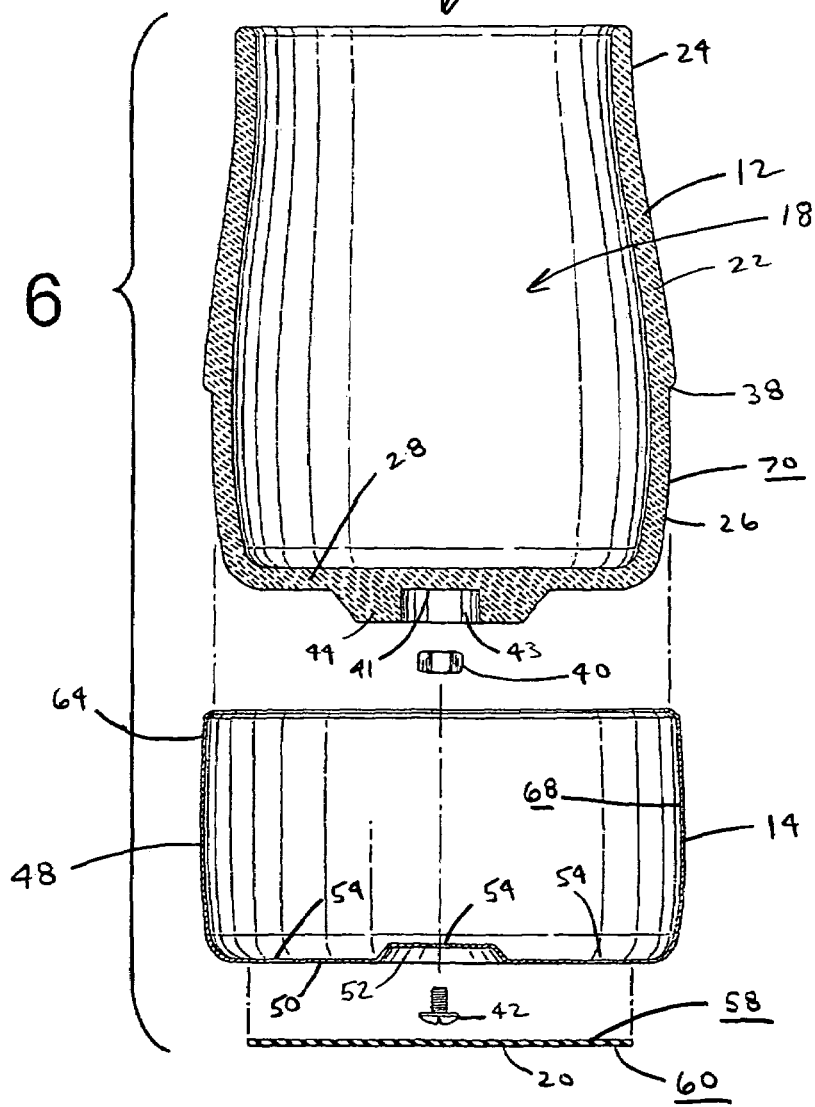

DRINKING CONTAINER WITH EXTERIOR SHELL

CROSS-REFERENCE TO RELATED APPLICATIONS

Not Applicable

FEDERALLY SPONSORED RESEARCH OR DEVELOPMENT

Not Applicable

TECHNICAL FIELD

The present invention relates generally to a drinking container, and more specifically to a two-component drinking container having an exterior shell and a manufacturing process for creating the two-component drinking container.

BACKGROUND OF THE INVENTION

Drinking containers are well known in the art. Such containers are generally used to provide a vessel for holding fluid and for allowing the user to drink therefrom. While drinking containers according to the prior art provide a number of advantageous features, they nevertheless have certain limitations. The present invention seeks to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY OF THE INVENTION

The present invention generally provides a portable drinking container. One embodiment of the drinking container comprises a drinking vessel and a separate exterior shell or skirt around a distal end portion of the drinking vessel. Additionally, a foam material is provided between the skirt and the drinking vessel to assist in securing the skirt to the drinking vessel.

According to one embodiment, the drinking vessel has a sidewall defining a first cavity. An opening to the cavity is provided at a proximal end of the drinking vessel. The bottom of the drinking vessel has a bottom wall, which may be a part of the sidewall of the drinking vessel. If a separate bottom wall is provided, the sidewall generally extends from the bottom wall up to the opening of the drinking vessel. The drinking vessel generally comprises a first container which holds the liquid and from which the liquid is dispensed.

According to another embodiment, an exterior shell or skirt is provided around a portion of the drinking vessel. The skirt also has a sidewall, and it may comprise a bottom wall like the drinking vessel. Additionally, a first end of the skirt is provided distal the proximal end of the drinking vessel such that it is generally a distance from the opening of the drinking vessel. In one embodiment the first end of the skirt engages the sidewall of the drinking vessel, and in another embodiment the first end of the sidewall of the skirt engages the sidewall of the drinking vessel at an indentation of the sidewall of the drinking vessel.

According to another embodiment, a second cavity is provided between the skirt and the drinking vessel. In such an embodiment a foam material is generally located within the second cavity. In another embodiment, the skirt has an aperture in the bottom wall thereof that provides access to the second cavity.

According to another embodiment the drinking vessel is made of a first material and the skirt is made of a second material distinct from the first material. In a preferred embodiment, the first material that makes up the drinking vessel is a ceramic, and the second material that makes up the skirt is a stainless steel.

According to another embodiment, a removable fastener is provided to assist in connecting the skirt to the drinking vessel. To assist in this embodiment, a mating member may be provided and extending from the drinking vessel. The mating member is generally adapted to removably receive the fastener extending through the skirt to connect the skirt to the drinking vessel.

According to another embodiment, the drinking container has a handle. The handle may be an integral component that extends from the drinking vessel. In one embodiment the handle is made of the same material as the first material of the drinking vessel.

According to another embodiment, the drinking container has a non-skid base member extending from a bottom portion of the skirt. The non-skid base member may also operate as a coaster for the drinking container. In a preferred embodiment, the non-skid base member depends from the bottom wall of the skirt. In an alternate embodiment, the bottom wall of the skirt has a recessed area, and the non-skid base member extends from the recessed area of the bottom wall of the skirt.

According to another embodiment, the drinking container further has a removable lid that mates with the opening of the cavity to close the opening.

According to yet another embodiment, the drinking container comprises a ceramic vessel and an exterior member disposed about an exterior lower portion of the ceramic vessel. The ceramic vessel has a sidewall and a bottom wall defining a first cavity, and an opening providing access to the first cavity adjacent a proximal end of the sidewall of the ceramic vessel. A handle extends from the sidewall of the ceramic vessel. The exterior member is made of a metal material. A second cavity exists between an outer surface of the ceramic vessel and an inner surface of the exterior member, and an insulating foam is positioned in the second cavity. The exterior member is made of a material distinct from the material of the drinking vessel, and preferably is made of a metal such as stainless steel. Additionally, in a preferred embodiment the foam is a closed-cell polymeric material.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 3 is a top plan view of the drinking container of FIG. 2;

FIG. 4 is a side cross-sectional view taken about line 4-4 of FIG. 2 prior to insertion of the foam;

FIG. 5 is a side cross-sectional view taken about line 4-4 of FIG. 2 following insertion of the foam;

FIG. 6 is an exploded view of the drinking container of FIG. 2 prior to the insertion of the foam;

DETAILED DESCRIPTION

Figure 1:
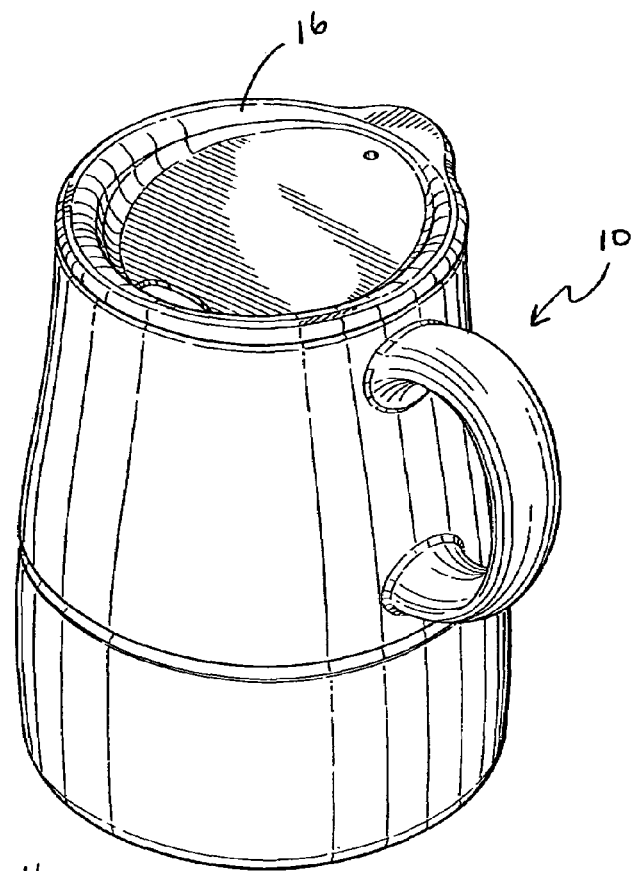
FIG. 1 is a perspective view of one embodiment of a drinking container comprised of a drinking vessel and an exterior shell connected to the drinking vessel.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
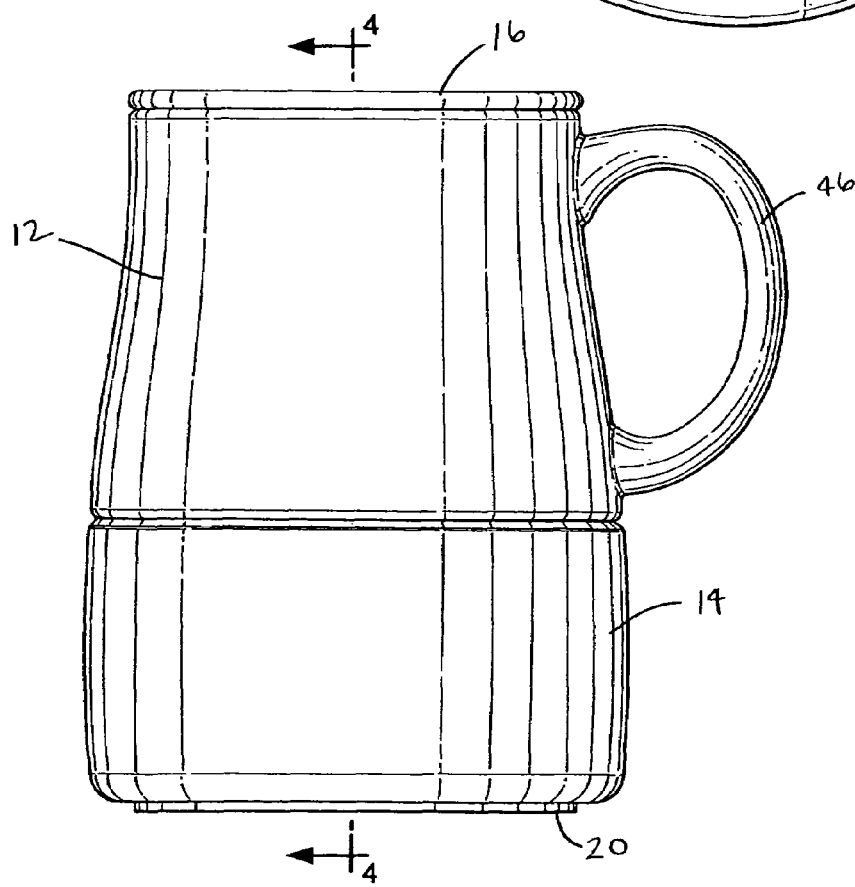
FIG. 2 is a side elevation view of one embodiment of a drinking container with the lid.

Referring now to the Figures, and specifically to FIGS. 1 and 2, there is shown a drinking container 10 generally comprising a drinking vessel 12 and an exterior shell or skirt 14 connected to the drinking vessel 12 and positioned generally around at least a portion of the drinking vessel 12. The drinking container 10 may also have a removable lid 16 covering the first cavity 18 (see FIG. 4) of the drinking vessel 12, and a non-skid pad 20 on the bottom of the drinking container 10. As explained herein, in one embodiment the drinking vessel 12 is made of a first material, and the exterior shell 14 is made of a second material.

The drinking vessel 12 generally comprises a first container which holds the liquid and from which the liquid is dispensed from the drinking container 10. The drinking vessel 12 has a sidewall 22 which extends from a proximal end portion 24 of the drinking vessel 12 to generally a distal end portion 26 of the drinking vessel 12. In the embodiment illustrated, the drinking vessel 12 also has a bottom wall 28 at the distal end portion 26 thereof and extending from the sidewall 22, and further in this embodiment the bottom wall 28 is generally transverse to the sidewall 22 of the drinking vessel 12. As shown in FIG. 4, the inner surfaces of the sidewall 22 and bottom wall 28 define the first cavity 18 of the drinking container 10. The first cavity 18 of the drinking vessel 12 is generally the cavity that contains or holds liquid for the drinking container 10. The first cavity 18 has an opening 30 at the proximal end portion 24 of the drinking vessel 12 to provide access to the first cavity 18. The first cavity 18 is generally filled with any liquid through the opening 30 thereof, and, when utilized, the removable lid 16 mates with the drinking vessel 12 and is positioned to cover the opening 30 of the first cavity 18 of the drinking vessel 12 to assist in closing the opening 30 to the first cavity 18 and retaining any liquid in the first cavity 18 thereof.

Further, the sidewall 22 of the drinking vessel 12 may have a variety of contours. Referring again to FIG. 4, in one embodiment the sidewall 22 has a cylindrical portion 32, a first frustoconical portion 34 angled inwardly toward a centerline of the drinking vessel 12, and a second frustoconical portion 36 angled outwardly away from a centerline of the drinking vessel 12.

In one embodiment, the sidewall 22 of the drinking vessel 12 also has an indentation 38 at a point between the proximal end portion 24 and the distal end portion 26 of the drinking vessel 12, and in the sidewall 22 thereof. As shown in FIGS. 4-6, in this embodiment the exterior shell 14 engages the sidewall 22 of the drinking vessel 12 at the indentation 38 in the sidewall 22. Such engagement may include a pressure fit between the exterior shell 14 and the indentation 38 of the sidewall 22.

As explained above, the bottom wall 28 of the drinking vessel 12 is generally positioned at the distal end portion 26 of the sidewall 22, and is generally transverse to the sidewall 22 of the drinking vessel 12. In one embodiment, the bottom wall 28 has means for assisting in connecting the exterior shell 14 to the drinking vessel 12. Such means may include a mating member 40 at the distal end portion 26 of the drinking vessel 12. In one embodiment, the mating member 40 is adapted to removably receive a fastener 42 to assist in securing the exterior shell 14 to the drinking vessel 12. In a preferred embodiment, as shown in FIGS. 4 and 6, the mating member 40 is a nut which engages a fastener 42, such as a bolt or screw, as described in more detail herein. In a preferred embodiment, the mating member 40 is secured to the drinking vessel 12 in an opening 43 at the bottom wall 28 of the drinking vessel 12. As best shown in FIG. 4, a generally annular protrusion 44 extends from the bottom wall 28 of the drinking vessel 12, and the opening or cavity 43 is defined between the inner walls of the protrusion 44. The mating member 40 or nut is then secured in the opening 43, typically to the bottom wall 41 of the opening 44. In one embodiment, the mating member 40 is adhesively secured to the bottom wall 41 of the opening 43, including with an epoxy, to generally retain the mating member 40 in place.

The drinking container 10 may also have a handle 46. In one embodiment, the handle 46 in integral with the drinking vessel 12 and extends from the sidewall 22 of the drinking vessel 12. Thus, generally the handle 46 is made of the same material as the drinking vessel 12.

The drinking vessel 12 is generally unitarily formed of a rigid material. In one embodiment, the drinking vessel 12 is made of a first material, and the exterior shell 14 is made of a second material distinct or different from the first material. In a preferred embodiment, the first material is a ceramic material, and the second material is a metal material, such as stainless steel. It is understood by those having ordinary skill in the art, however, that other materials may be utilized without departing from the spirit and scope of the present invention.

As best shown in FIGS. 4-7, the exterior shell 14 generally comprises a secondary component provided around or disposed about the distal end portion of the drinking vessel 12. More specifically, the exterior shell 14 is generally disposed about an exterior lower portion of the sidewall 22 of the drinking vessel 12 and preferably a bottom wall 28 of the drinking vessel 12. Like the drinking vessel 12, the exterior shell 14 has a generally cylindrical sidewall 48 and a bottom wall 50 extending therefrom. The bottom wall 50 of the exterior shell 14 generally forms the bottom of the drinking container 10. The exterior shell 14 is generally formed of a thin-walled metal material.

The bottom wall 50 of the exterior shell 14 also has a first recessed area 52, and at least one aperture 54. In one embodiment, as shown in FIG. 4, the first recessed area 52 is utilized to sink or recess the head of the fastener 42 below an exterior plane of the bottom wall 50 of the exterior shell 14, which in this embodiment coincides with a plane of the inner surface 58 of the non-skid pad 20, and thereby to prevent the head of the fastener 42 from interfering with the non-skid pad 20 on the bottom of the exterior shell 14. As shown in FIGS. 2 and 4, the inner surface 58 of the non-skid pad 20 is secured to the bottom wall 50 of the exterior shell 14. This is typically accomplished with an adhesive, although other methods may be employed.

Figure 8:
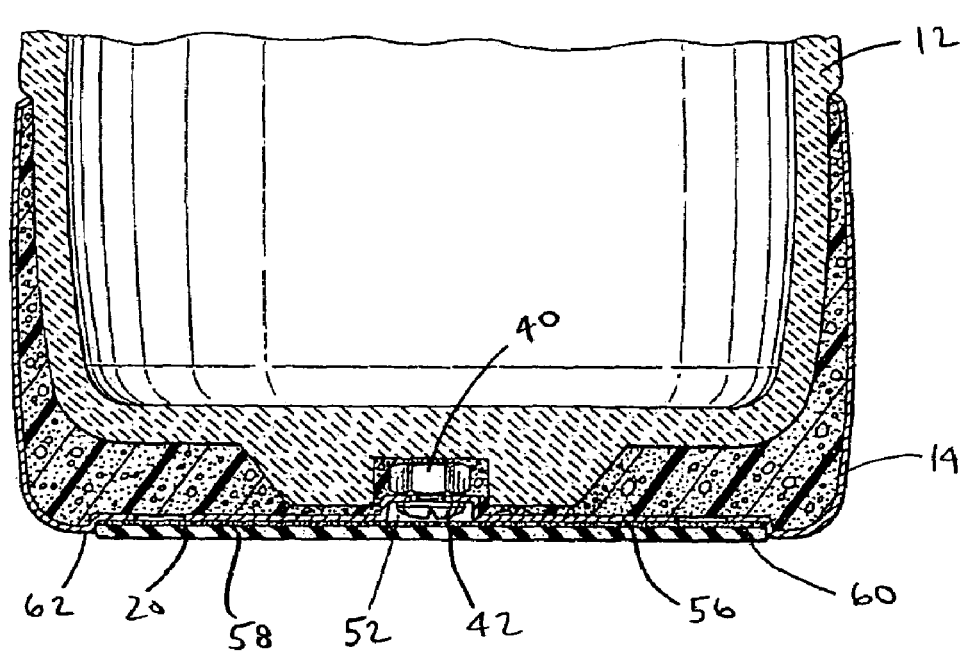

In another embodiment, as shown in FIG. 8, the exterior shell 14 is provided with a first recessed area 52 and a second recessed area 56. In this embodiment, the first recessed area 52 is also utilized to sink the head of the fastener 42 below the plane of the inner surface 58 of the non-skid pad 20. The first recessed area 52 in this embodiment, however, is designed to be approximately the same shape and/or size as the head of the fastener 42. Accordingly, far less excess air can be trapped in the first recessed area 52 between the bottom wall 50 of the exterior shell 14 and the inner surface 58 of the non-skid pad 20. Additionally, the second recessed area 56 in this embodiment is utilized as a radial counterbore to partially recess the non-skid pad 20 in the bottom of the exterior shell 14. More specifically, in this embodiment the inner surface 58 of the non-skid pad 20 generally depends from and is secured to the lower surface of the second recessed area 56. Further, as shown in FIG. 8, the depth of the second recessed area 56 is generally smaller than the thickness of the non-skid pad 20 to allow a portion of the non-skid pad 20 to be exposed from the exterior shell 14 (i.e., the plane of the outer surface 60 of the non-skid pad 20 when properly seated in the second recessed area 56 is at least slightly exterior of the plane of the bottom wall 50 of the exterior shell 14) when the non-skid pad 20 is properly seated in the second recessed area 56. Accordingly, due to the second recessed area 56, in this embodiment a lip 62 in the exterior shell 14 is created radially outward of the second recessed area 56.

The non-skid pad 20 is generally a member that operates as a base for the drinking container 10. In a preferred embodiment, the non-skid base 20 is made of a rubber or some other similar material, and further operates as a coaster for the drinking container 10. While it is referred to as a non-skid pad, it is not necessary that it prevent movement or skidding of the drinking container 10.

Figure 7:
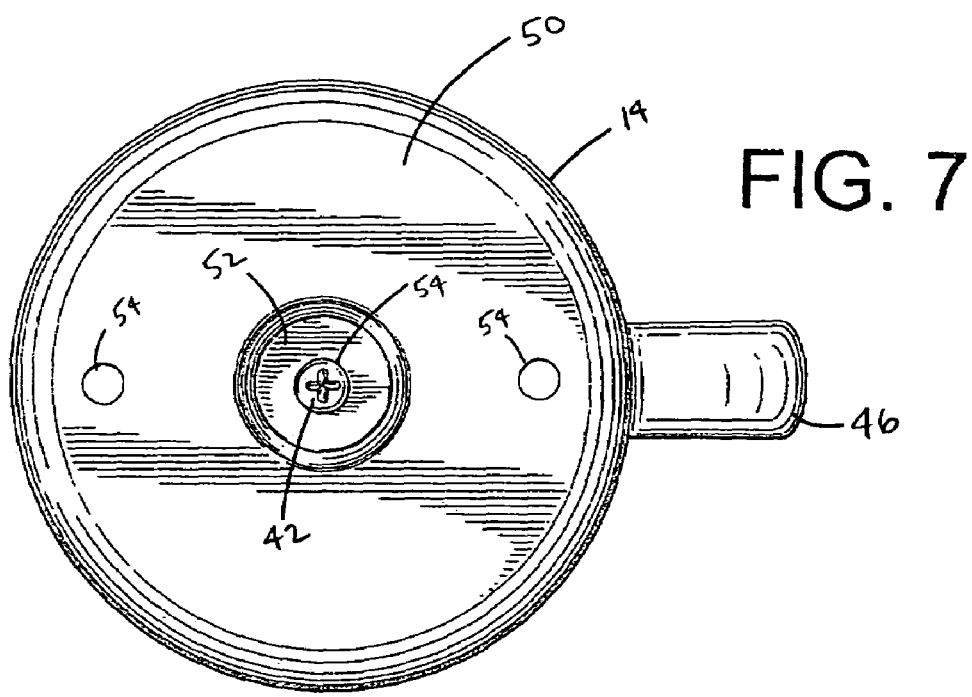
FIG. 7 is a bottom view of one embodiment of the exterior shell for the drinking container without the non-skid pad; and, FIG. 8 is a partial side cross-sectional view of another embodiment of an exterior shell with a non-skid pad for the drinking container.

In a preferred embodiment, as shown in FIG. 7, three apertures are provided, one aperture 54 associated with the first recessed area 52, and two additional apertures 54 distinct from the first recessed area 52. The aperture 54 provided in the first recessed area 52 is utilized as an opening to allow a portion of the fastener 42 to pass through the bottom wall 50 of the exterior shell 14 for mating with the mating member 40. As explained in more detail herein, the other two apertures 54 not associated with the first recessed area 52 are utilized to provide access to fill a second cavity 66 with a foam material and to simultaneously evacuate air therefrom.

Referring to FIGS. 4 and 8, when the exterior shell 14 is in position on the drinking vessel 12, the first end 64 of the exterior shell 14 is provided distal the proximal end portion 24 of the drinking vessel 12. Generally, a portion of the first end 64 of the exterior shell 14 engages the sidewall 22 of the drinking vessel 12. In a preferred embodiment, a portion of the first end 64 of the exterior shell 14 engages the indentation 38 in the sidewall 22 of the drinking vessel 12 as explained above.

Additionally, as shown in FIGS. 4 and 8, when the exterior shell 14 is in position on the drinking vessel 12, a second cavity 66 is created between the inner surface 68 of the exterior shell 14 and the outer surface 70 of the drinking vessel 12. In such an embodiment, as shown in FIG. 5, after the exterior shell 14 is positioned on the drinking vessel 12, and the second cavity 66 is thus created therebetween, an auxiliary material 72 is inserted into and located in the second cavity 66. In one embodiment, the auxiliary material 72 is an insulating material. In another embodiment, the auxiliary material 72 is a foam material, and is preferably a closed-cell insulating foam. Additionally, the insulating foam material 72 may be a polymeric-based material, such as a polyurethane.

Referring again to FIG. 5, the foam material 72 is generally located within the second cavity 66. Further, the foam material 72 may be located within the opening 43 and around the nut 40. Additionally, referring again to FIG. 7, the foam material 72 is generally inserted as a somewhat viscous material into the second cavity 66 through one of the apertures 54 not associated with the first recess 52, to thereby fill the second cavity 66 and possibly the opening 43. Further, a fastener 42 may be utilized to further secure the exterior shell 14 to the mating member 40 of the drinking vessel 12 by inserting the fastener 42 through the first aperture 54 in the first recessed area 52 and securedly mating the fastener 42 to the mating member 40. The securing of the exterior shell 14 to the drinking vessel 12, and fastening of the two components, however, is completed prior to the insertion of the foam material 72 in the second cavity 66. Once the exterior shell 14 is secured to the drinking vessel 12, the foam material 72 is inserted into the second cavity 66. The foam material 72 may operate as an insulating material and/or one of a securing means to connect the exterior shell 14 to the drinking vessel 12. The foam material 72 is inserted into the second cavity 66 generally by injecting the foam material 72 through one of the additional apertures 54 in the bottom wall 50 of the exterior shell 14. As the foam material 72 fills the second cavity 66, air is evacuated from the second cavity 66 through the other additional aperture 54 until generally the entire second cavity 66 is filled with the foam material 72. Finally, the non-skid pad 20 is placed on the bottom wall 50 of the exterior shell 14 and covering the apertures 54 and the first recess 52.

Thus, the exterior shell or skirt 14 of the drinking container 10 is connected to the drinking vessel 12 generally via a variety of possible means. In one example, the exterior shell 14 may be connected to the drinking vessel 12 with a fastener 22 as shown in FIG. 4. Separately and/or additionally, the exterior shell 14 may be connected to the drinking vessel 12 with the use of the foam material 72. Further, an adhesive may be utilized to assist in providing a connection between the exterior shell 14 and the drinking vessel 12. Accordingly, any one or more of the above methods of connection between the drinking vessel 12 and the exterior shell 14 may be utilized without departing from the scope of the present invention.

As best shown in FIG. 4, the drinking container 10 also has a removable lid 16. The lid 16 is preferably made of a rigid material such as a molded plastic, including but not limited to polypropylene. In one embodiment the lid 16 comprises a generally cylindrical upstanding perimetral wall 80, a sloped top wall 82, and an opening 84 in its top wall 82. The opening 84 provides access to the first cavity 18 of the drinking container 10. The lid 16 also has a flange 86 which the user can grasp to remove the lid 16 from the drinking container 10. Further, the lid 16 has an exterior gasket 88 which engages the interior surface of the first cavity 18 adjacent the proximal end 24 of the drinking vessel 12. The gasket 88 assists in retaining the lid 16 connected to the drinking container 10, and also prevents liquid from seeping out of the drinking container 10 except as required through the drinking aperture 84.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while specific embodiments have been illustrated and described, numerous modifications come to mind without significantly departing from the spirit of the invention and the scope of protection is only limited by the scope of the accompanying Claims.

What is claimed is:

1. A drinking container, comprising:
    a ceramic drinking vessel having a sidewall and a bottom wall defining a first cavity, the cavity having an opening at a proximal end of the sidewall of the drinking vessel, the sidewall of the ceramic drinking vessel having a transition positioned a distance from the opening of the ceramic drinking vessel and the bottom wall of the ceramic drinking vessel; and,
    an exterior sheetmetal skirt disposed about a portion of the sidewall of the drinking vessel to create a double-walled drinking container, wherein a first end of the skirt opposing a bottom of the skirt engages the transition of the ceramic drinking vessel at a tangential angle toward the drinking vessel, and wherein the first end of the skirt has approximately the same thickness as a sidewall of the skirt.

2. The drinking container of claim 1, further comprising a second cavity between an outer surface of the drinking vessel and an inner surface of the skirt, the cavity extending from the bottom of the skirt to the first end of the skirt, and a foam material in the second cavity between the skirt and the drinking vessel.

3. The drinking container of claim 1, wherein the first end of the skirt is not connected to the drinking vessel with a separate adhesive or fastener.

* * * * *